(12) United States Patent
Duval

(10) Patent No.: US 11,501,027 B2
(45) Date of Patent: Nov. 15, 2022

(54) MECHANISM TO SUPPORT WRITING FILES INTO A FILE SYSTEM MOUNTED IN A SECURE MEMORY DEVICE

(71) Applicant: Micron Technology, Inc., Boise, ID (US)

(72) Inventor: Olivier Duval, Pacifica, CA (US)

(73) Assignee: Micron Technology, Inc., Boise, ID (US)

(*) Notice: Subject to any disclaimer, the term of this patent is extended or adjusted under 35 U.S.C. 154(b) by 42 days.

(21) Appl. No.: 17/170,762

(22) Filed: Feb. 8, 2021

(65) Prior Publication Data
US 2022/0253564 A1 Aug. 11, 2022

(51) Int. Cl.
G06F 7/04 (2006.01)
G06F 21/79 (2013.01)
G06F 21/64 (2013.01)
G06F 21/57 (2013.01)
G06F 21/62 (2013.01)
H04N 7/16 (2011.01)

(52) U.S. Cl.
CPC ............ G06F 21/79 (2013.01); G06F 21/575 (2013.01); G06F 21/6218 (2013.01); G06F 21/64 (2013.01); *G06F 2221/0751* (2013.01)

(58) Field of Classification Search
CPC .... G06F 21/79; G06F 21/575; G06F 21/6218; G06F 21/64; G06F 2221/0751
See application file for complete search history.

(56) References Cited

U.S. PATENT DOCUMENTS

| | | | |
|---|---|---|---|
| 7,603,533 B1* | 10/2009 | Tsypliaev | G06F 21/575 |
| | | | 711/158 |
| 7,953,948 B1* | 5/2011 | Dyatlov | G06F 11/1435 |
| | | | 711/158 |
| 8,010,559 B2* | 8/2011 | Verma | G06F 16/1865 |
| | | | 707/706 |
| 8,069,320 B1* | 11/2011 | Per | G06F 11/1451 |
| | | | 707/646 |
| 8,700,727 B1* | 4/2014 | Gole | H04L 67/104 |
| | | | 709/213 |

(Continued)

OTHER PUBLICATIONS

International Search Report and Written Opinion, PCT/US2022/014050, dated May 4, 2022.

*Primary Examiner* — Gary S Gracia
(74) *Attorney, Agent, or Firm* — Greenberg Traurig (57) ABSTRACT

A system, method and apparatus to record a file in a file system that is mounted in a secure section of a memory device. The memory device authenticates a requester to write data into secure section based on whether the requester is in possession of a cryptographic key. Nonprivileged modules of the operation system can write into a nonsecure section of the memory device. Requests to write or change a file can be recorded by nonprivileged modules into the nonsecure section for subsequent committing into the file system. In response to a request to commit the file, a security manager having the cryptographic key is called to identify, based on the records in the nonsecure section, data eligible to be written into the secure section. The security manager can generate commands, signed using the cryptographic key, to write the content of the file into the secure memory section.

20 Claims, 6 Drawing Sheets

(56) References Cited

U.S. PATENT DOCUMENTS

| | | | |
|---|---|---|---|
| 8,799,903 B1 * | 8/2014 | Talwar | G06F 9/5094 |
| | | | 718/100 |
| 9,213,866 B1 * | 12/2015 | Ahmad | G06F 21/76 |
| 9,628,146 B2 * | 4/2017 | Van Nieuwenhuyze | |
| | | | G06K 7/10237 |
| 10,776,206 B1 * | 9/2020 | Vaghani | G06F 11/1471 |
| 11,288,237 B2 * | 3/2022 | Karampuri | G06F 16/172 |
| 2002/0062447 A1 * | 5/2002 | King | H04L 69/40 |
| | | | 726/4 |
| 2005/0066140 A1 | 3/2005 | Pistoulet | |
| 2007/0168678 A1 | 7/2007 | Meenakshisundaram | |
| 2008/0163368 A1 * | 7/2008 | Harris | G06F 21/79 |
| | | | 726/21 |
| 2009/0193266 A1 | 7/2009 | Gable et al. | |
| 2011/0302213 A1 * | 12/2011 | Noguchi | G06F 16/10 |
| | | | 707/E17.012 |
| 2013/0276146 A1 * | 10/2013 | Gilani | G06F 21/10 |
| | | | 726/29 |
| 2015/0269025 A1 * | 9/2015 | Krishnamurthy | G06F 11/1092 |
| | | | 714/6.24 |
| 2015/0277762 A1 * | 10/2015 | Guo | G06F 3/0653 |
| | | | 711/154 |
| 2017/0177447 A1 * | 6/2017 | Golander | G06F 11/1471 |
| 2018/0060077 A1 | 3/2018 | Abdulhamid et al. | |
| 2018/0278413 A1 * | 9/2018 | Dover | G06F 21/64 |
| 2019/0238312 A1 * | 8/2019 | Dickens, III | H04L 9/0643 |
| 2019/0265964 A1 * | 8/2019 | Koike | G06F 9/441 |
| 2022/0156747 A1 * | 5/2022 | Kumawat | G06Q 20/341 |

\* cited by examiner

MECHANISM TO SUPPORT WRITING FILES INTO A FILE SYSTEM MOUNTED IN A SECURE MEMORY DEVICE

TECHNICAL FIELD

At least some embodiments disclosed herein relate to access control in general, and more particularly, but not limited to writing files into a file system mounted in a secure memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a security manager configured to transfer data of files in a file system mounted in a secure section of a memory sub-system, from a non-secure section into the secure section. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A secure memory device can store a device secret for authentication and access control. For example, a physical unclonable function (PUF), also known as physically unclonable function (PUF), can be used to generate an unique secret for the secure memory device. A cryptographic key can be generated based on the secret and used as an identity of the memory device.

For example, authentication of the secure memory device can be performed through the verification that the memory device has the cryptographic key and thus the unique secret. The memory device can digitally sign a message using the cryptographic key. If the digital signature can be verified to have been created using the cryptographic key, the memory device is seen to be in possession of the cryptographic key and thus have the identity associated with the physical unclonable function (PUF) and/or the unique device secret.

Further, the secure memory device can store cryptographic keys to authenticate that received commands are from its authorized users or owner. For example, a command to access a secure section of the memory device can be required to have a digital signature from an authorized user or owner; and a corresponding cryptographic key stored in the secure memory device can be used to verify that the digital signature is created using a cryptographic key of an authorized user or the owner of the secure memory device. If a command to access the secure section of the memory device is not signed by one of the authorized users or the owner of the device, the command can be rejected.

A digital signature can be generated and attached to a message by applying a cryptographic hash function to the message to obtain a hash value and encrypting the hash value using the cryptographic key. The encrypted hash value can be decrypted for comparison with a hash value calculated independently from the message. If there is a match between the hash value calculated from the message and the hash value recovered from decrypting the digital signature, the integrity of the message can be confirmed in view of the hash value; and the digital signature can be seen to have been created using the cryptographic key.

When a symmetric key cryptography is used, the encryption of the hash value and the decryption of the cipher text of the hash value are performed using a same cryptography key.

When an asymmetric key cryptography is used, the encryption of the hash value and the decryption of the cipher text of the hash value are performed using different keys of a key pair. A private key in the key pair is used to sign the digital signature; and a public key in the key pair is used to check the digital signature.

When a file system is mounted in a secure section of the secure memory device, it can be a challenge to allow applications having access to the file system to write data into the secure section of the memory device. For example, at the time of an application calling the operating system to write a file, the storage location within the secure section of the memory device may yet to be determined for the file.

At least some aspects of the present disclosure address the above and other deficiencies by allowing a file system to initially write data into a non-secure section of a memory device. When the operating system is ready to commit the data of a file into the file system, a security manager can identify the data of the file from the records in the non-secure section and generate signed commands to write the file into the secure section of the memory device. The security manager is configured with a cryptographic key to generate a valid digital signature for a signed command. After the digital signature is validated, the signed command can be executed by the memory device to write the file into the secure section of the memory device.

Since the data of the files in the file system is initially written into a non-secure section, various modules of the operating system do not have to be reconfigured to be able to handle signed commands that is specific to the secure section of the memory device. The security manager issues signed commands as a centralized representative of the operating system at the time of committing a file to the file system mounted in the secure section of the memory device. Thus, the security of the file system can be improved over distributing the access rights to various modules of the operating system.

For example, a secure integrated circuit memory device has a secure section. Writing data into the secure section can be controlled via cryptographically signed commands. One or more privileged applications can be configured with a cryptographic key usable to sign a command. The signed command can pass authentication performed by the secure memory device for the secure section and thus be executed for writing data in the secure section. However, at the time a privileged application issues a command to write data of a file, the privileged application typically does not know where in the secure section the file system will decide to write the data of the file.

At least one embodiment in the present disclosure includes a recording mechanism that can be initiated and configured by a privileged application as part of a security manager. While a file recording session is active, any module in an operating system can be allowed to write file data to the secure memory device using unsigned commands. However, the secure memory device is configured to temporarily write the file data in a non-secure section. The non-secure section in the secure memory device can be used a non-volatile buffer for the file recording session. After a file recording session ends, the privileged application can read the content in the buffer and decide what changes are to be committed into the secure section of the memory device. For data to be committed into the secure section of the memory device, the privileged application can use its cryptographic key to sign commands to write into the secure section of the memory device. Optionally, the resources of the security manager for recording data into the secure section can be kept in the secure section, including analysis tools for determining whether recordings are valid.

For example, a secure integrated circuit memory device is configured to allow any module in an operating system to write to a non-secure flash array during a file recording session for the file system mounted in a secure section of the memory device. Then, a software module running in the host computer (e.g., as a secure application or a module of an operating system) can use an algorithm is to analyze the recording in the non-secure flash array to decide whether any portion of the recorded write sequence shall be moved/committed from non-secure flash array to the secure section in which the file system is mounted. On a success of determining data to be committed into the file system, the secure application generates and sends a signed command to the storage device to move/commit the data into the secure section.

Figure 1:
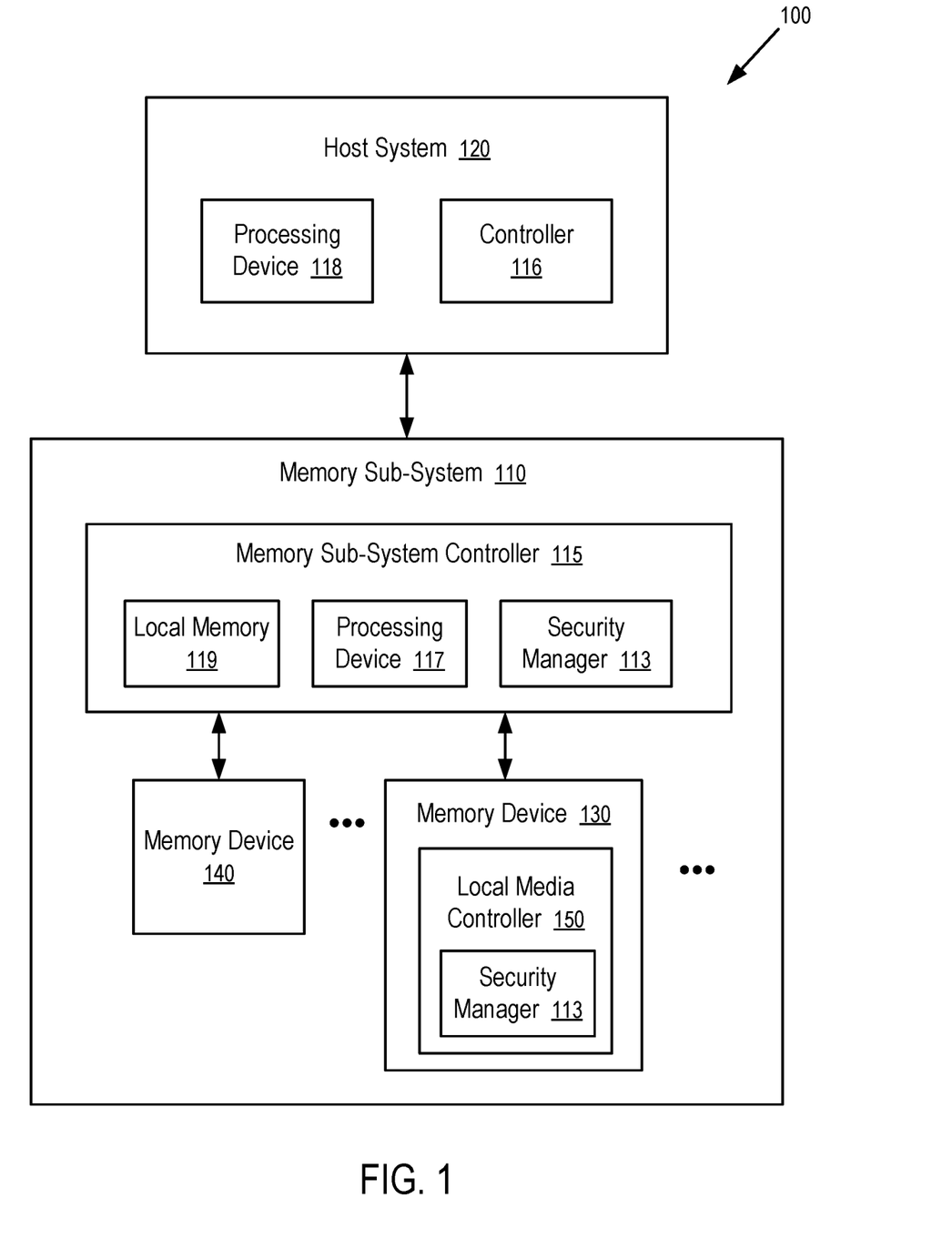
FIG. 1 illustrates an example computing system having a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (e.g., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (e.g., processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130).

In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a security manager 113 configured to use signed commands to commit file data buffered in a non-secure section of the memory device 130 into a secure section of the memory device 130. In some embodiments, the controller 115 and/or the local media controller 150 in the memory sub-system 110 can include at least a portion of the security manager 113. In other embodiments, or in combination, the controller 116 and/or the processing device 118 in the host system 120 can include at least a portion of the security manager 113. For example, the controller 115, the controller 116, and/or the processing device 118 can include logic circuitry implementing the security manager 113. For example, the controller 115, or the processing device 118 (e.g., processor) of the host system 120, can be configured to execute instructions stored in memory for performing the operations of the security manager 113 described herein. In some embodiments, the security manager 113 is implemented in an integrated circuit chip disposed in the memory sub-system 110. In other embodiments, the security manager 113 can be part of firmware of the memory sub-system 110, an operating system of the host system 120, a device driver, or an application, or any combination therein.

For example, the operating system of the computing system 100 can issue unsigned commands to write file data into the memory device 130. Data of the unsigned commands can be stored in a buffer in the memory device 130. For example, a non-secure section of the memory device 130 can be used as a non-volatile buffer to store the data of the unsigned commands. Thus, a typical module of the operating system relevant to the operations of the file system does not have to be able to sign a write command and/or aware of the authentication requirements of the secure section in the memory device 130. In response to an indication to commit a file in a file system that is mounted in a secure section of the memory device, the security manager 113 can identify the data of the file to be stored in the file system mounted in the secure section and generate signed commands to write the data into the secure section.

Figure 2:
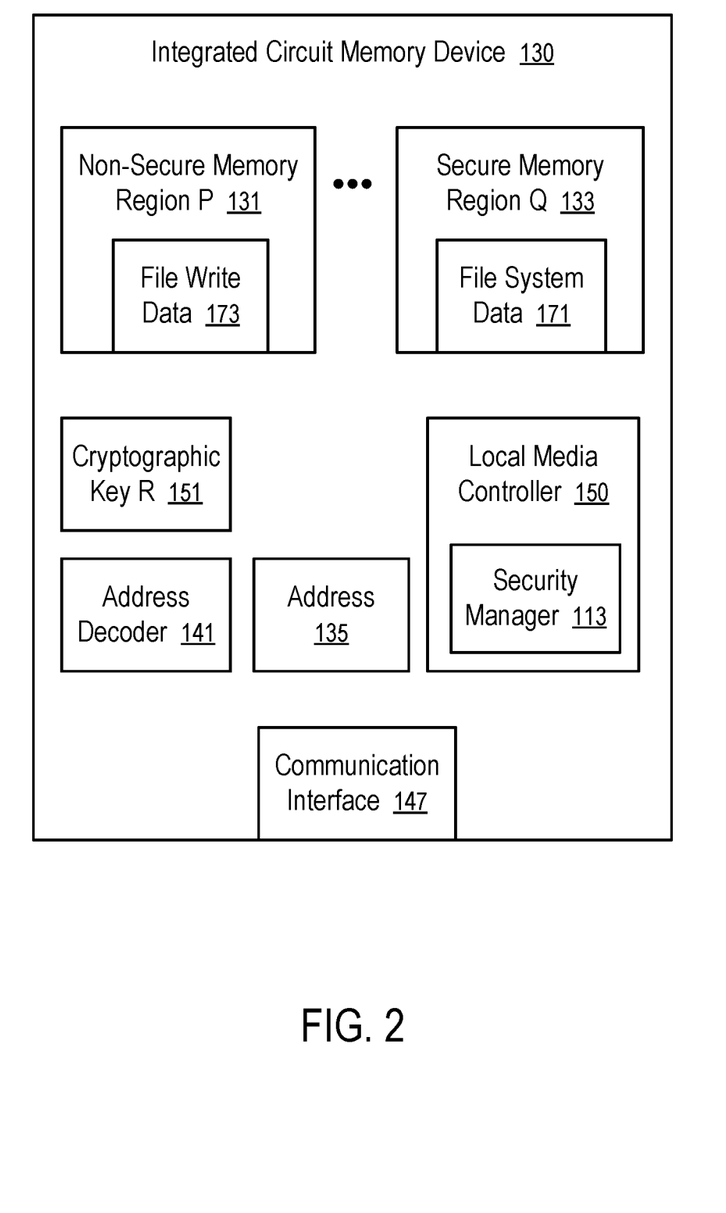
FIG. 2 illustrates an integrated circuit memory device having a security manager according to one embodiment.

FIG. 2 illustrates an integrated circuit memory device having a security manager according to one embodiment. For example, the memory devices 130 in the memory sub-system 110 of FIG. 1 can be implemented using the integrated circuit memory device 130 of FIG. 2.

The integrated circuit memory device 130 can be enclosed in a single integrated circuit package. The integrated circuit memory device 130 includes multiple memory regions 131, . . . , 133 that can be formed in one or more integrated circuit dies. A typical memory cell in a memory region 131, . . . , 133 can be programmed to store one or more bits of data.

The local media controller 150 can include at least a portion of a security manager 113 that is configured to control access to at least one of the memory regions 131, . . . , 133.

For example, the security manager 113 can control access to a secure memory region 133 based on a cryptographic key that is generated based on a secret of the integrated circuit memory device 130 and/or a cryptographic key representative of an owner or an authorized user of the memory device 130. For example, when a request or command to write data into the secure memory region 133 is received in the integrated circuit memory device 130, the security manager 113 verifies whether the request is from a requester having the cryptographic key. If no, the security manager 113 may reject the write request. To demonstrate that the request is from an authorized requester, the requester can digitally sign the request, or a challenge message, using the cryptographic key. When the security memory device 130 determines that the digital signature is made using the cryptographic key, the requester has the permission to write the data into the memory region 131. For example, the memory device 130 can store a cryptographic key 151 that is used to authenticate the digital signature of the signed request/command.

In general, the secure memory region 133 can have different security requirements for different types of accesses (e.g., read, write, erase). For example, the secure memory region 133 can be configured to require digital signatures verifiable via the cryptographic key 151 to write or change data in the secure memory region 133 but does not require a signed command to read the data from the secure memory region 133. Alternatively, the secure memory region 133 can be configured to require digital signatures verifiable via the cryptographic key 151 to read, write, and/or change data in the secure memory region 133. Alternatively, the secure memory region 133 can be configured to require digital signatures verifiable via different cryptographic keys for different operations, such as read, write, change, erase, etc., in the secure memory region 133.

For example, the computing system 100 can mount a file system in the secure memory region 133, such that the file system data 171 is to be stored within the secure memory region 133. Access to the file system data 171 stored in the secure memory region 133 can require commands/requests signed using the cryptographic key associated with the access control of the secure memory region 133.

To facilitate the recording of a file in the file system, the memory device 130 can allocate a non-secure memory region 131 to buffer access requests/file data of the file. The non-secure memory region 131 is accessible via a request/command that does not have an attached digital signature of the requester. Thus, the non-secure memory region 131 can be used by the controller 150 as a buffer to store file write data 173 that may be relevant to the file in the file system mounted in the secure memory region 133. In response to an indication to commit the file, the security manager 113 (e.g., as implemented in the memory device 130, or running partially in the processing device 118 of the host system 120 and/or in the processing device 117 of the controller of the memory sub-system 110) can copy the valid data of the file from the non-secure memory region 131 into the secure memory region 133. Optionally, the security manager 113 and/or the operating system can further verify that the file is being written by an authorized user and/or the owner of the memory device 130, before committing the file into the secure memory region 133.

The integrated circuit memory device 130 has a communication interface 147 to receive a command having an address 135 from the controller 115 of a memory sub-system 110. In response to the address 135 identifying a memory region 131 that requires access control, the security manager 113 can perform cryptographic operations to verify that the request is from a requester having the cryptographic key authorized for the access to the memory region 131, before providing memory data retrieved from the memory region 131 using an address decoder 141. The address decoder 141 of the integrated circuit memory device 130 converts the address 135 into control signals to select a group of memory cells in the integrated circuit memory device 130; and a local media controller 150 of the integrated circuit memory device 130 performs operations to determine the memory data stored in the memory cells at the address 135.

Figure 3:
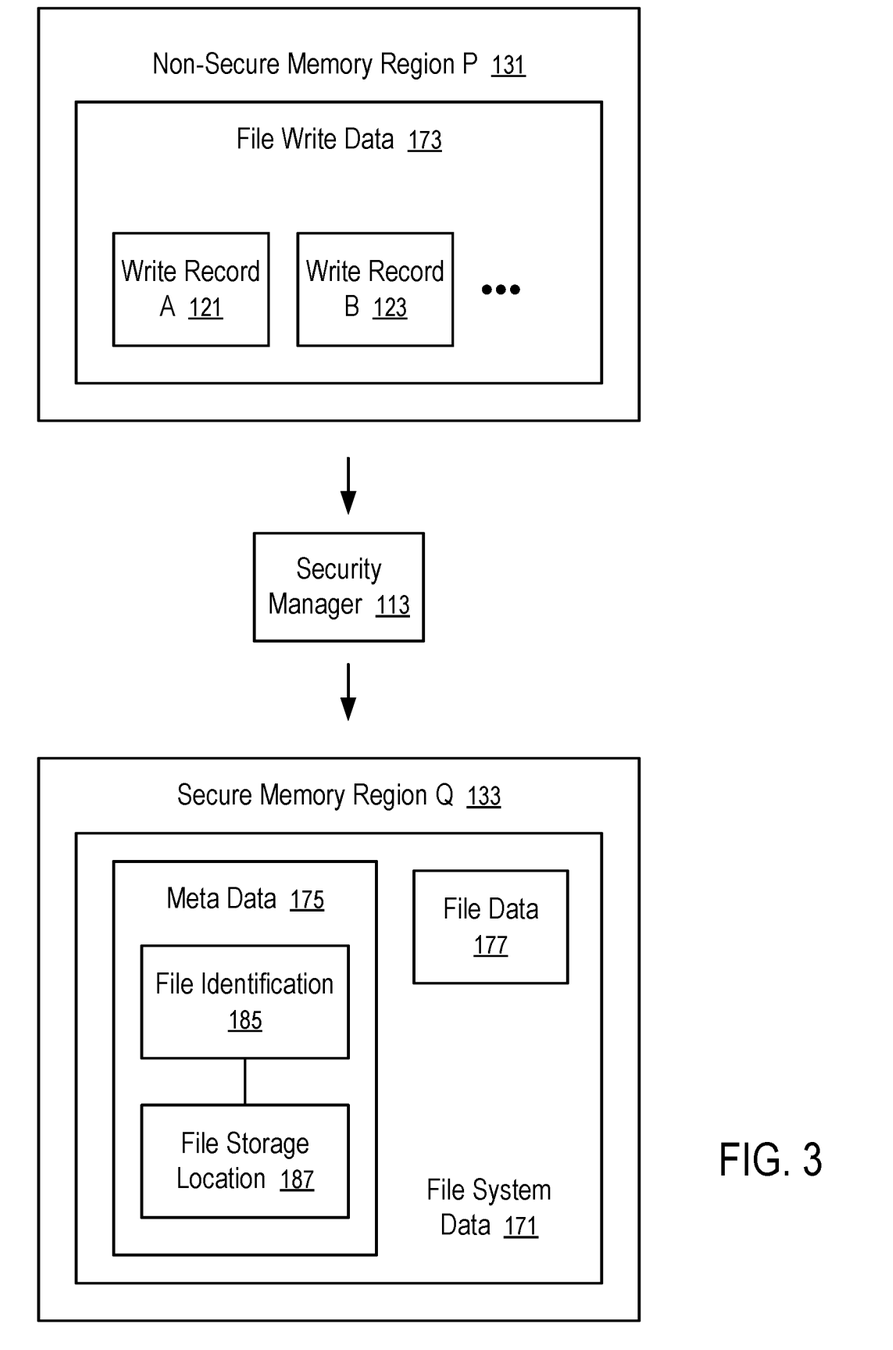
FIG. 3 illustrates a mechanism to support writing files into a file system mounted in a secure memory device according to one embodiment.

FIG. 3 illustrates a mechanism to support writing files into a file system mounted in a secure memory device according to one embodiment. For example, the mechanism of FIG. 3 can be implemented in the memory device 130 of FIG. 1 and/or FIG. 2.

In FIG. 3, records of commands to write files into a file system mounted in the secure memory region 133 can be buffered in the non-secure memory region 131 as file write data 173. For example, when an application requests the operating system of the computing system to write data into a file in the file system, the operating system can verify the access rights of the requester and then generate an unsigned command. Upon receiving the unsigned command, the memory device 130 generates a write record 121 for the write command in the non-secure memory region 131. The write record 121 can identify the file and the location of the data in the file. However, the target location of the data within the secure memory region 133 is yet to be determined. Another request to write data into the file system, in the same file (or another file) can generate another write record 123.

Optionally, the write records (e.g., 121, . . . , 123) can be processed and organized according to file recording sessions. When a file in the file system mounted in the secure memory region 133 is open for recording, the memory device 130 can accept unsigned write commands for storing/buffering in the non-secure memory region 131. Thus, when there is no active recording session for a file in the file system mounted in the secure memory region 133, the memory device 130 may reject unsigned write commands for improved security.

In response to a request to commit a file, or the closing of a file recording session, the security manager 113 identifies, from the write records (e.g., 121, 123, . . . ), the data/file content eligible to be written into the secure memory region 133 and generate commands to write the data/file content into the secure memory region 133.

The file system data 171 in the secure memory region 133 can include meta data 175 and file data 177. The meta data 175 includes a file identification 185 of a file and its file storage location 187 in the secure memory region 133. The file storage location 187 identifies the location or locations of one or more portions of the content of the file in the secure memory region 133. The content of the file is stored as the file data 177 at the locations identified by the file storage location 187 in the secure memory region 133. The file identification 185 identifies the file and/or its content in a way independent of its physical storage in a data storage device. A file system tracks the meta data 175 such that an application can call the operating system of the computing system 100 to store or retrieve data without the knowledge of the physical file storage location 187.

For example, in response to the request to commit the data/content of a file, the security manage 113 determines the file storage location 187 and generates command to write the content of the file into the secure memory region 133 at the location(s) identified by the file storage location 187. For example, the file system/operating system can allocate a portion of the storage capacity in the secure memory region 133 for the file data 177 and thus determine the file storage location 187 for the file identification 185.

In general, some data of a file as specified in the write records 121, 123, . . . etc. may be invalid for various reasons. For example, some data may be subsequently overwritten or changed. For example, some file write operations may be interrupted and/or canceled. For example, some file data may be invalidated, corrupted, and/or rolled back. The final, valid version of content of the file to be committed to the file system can be determined from an analysis of the write records 121, 123, . . . , etc. Subsequently, the file system generates and/or updates the relevant portion of the meta data 175 to specify the locations in the secure memory region 133 for the storing of the content of the file. Based on the file storage location 187, signed write commands can be generated by the security manager 113 to write the file data 177 into the secure memory region 133.

For example, a portion of the security manager 113 can be implemented as an application or module of the operating system of the computing system 100. When the operating system is booted (e.g., during the booting up of the operating system), the portion of the security manager 113 can be initialized to have a cryptographic key that is valid to sign commands transmitted to the memory sub-system 110 for writing the file data 177 into the secure memory region 133 of the memory device 130. In response to an indication or decision to commit the file into the file system, the portion of the security manager 113 can be called by the operating system to identify the content to be written into the secure memory region 133 and generate signed commands to write the content of the file.

Alternatively, a portion of the security manager 113 can be implemented in the controller 150 of the memory device 130, and/or in the controller 115 of the memory sub-system 110 to write the valid file data 177 into the secure memory region 133.

Figure 4:
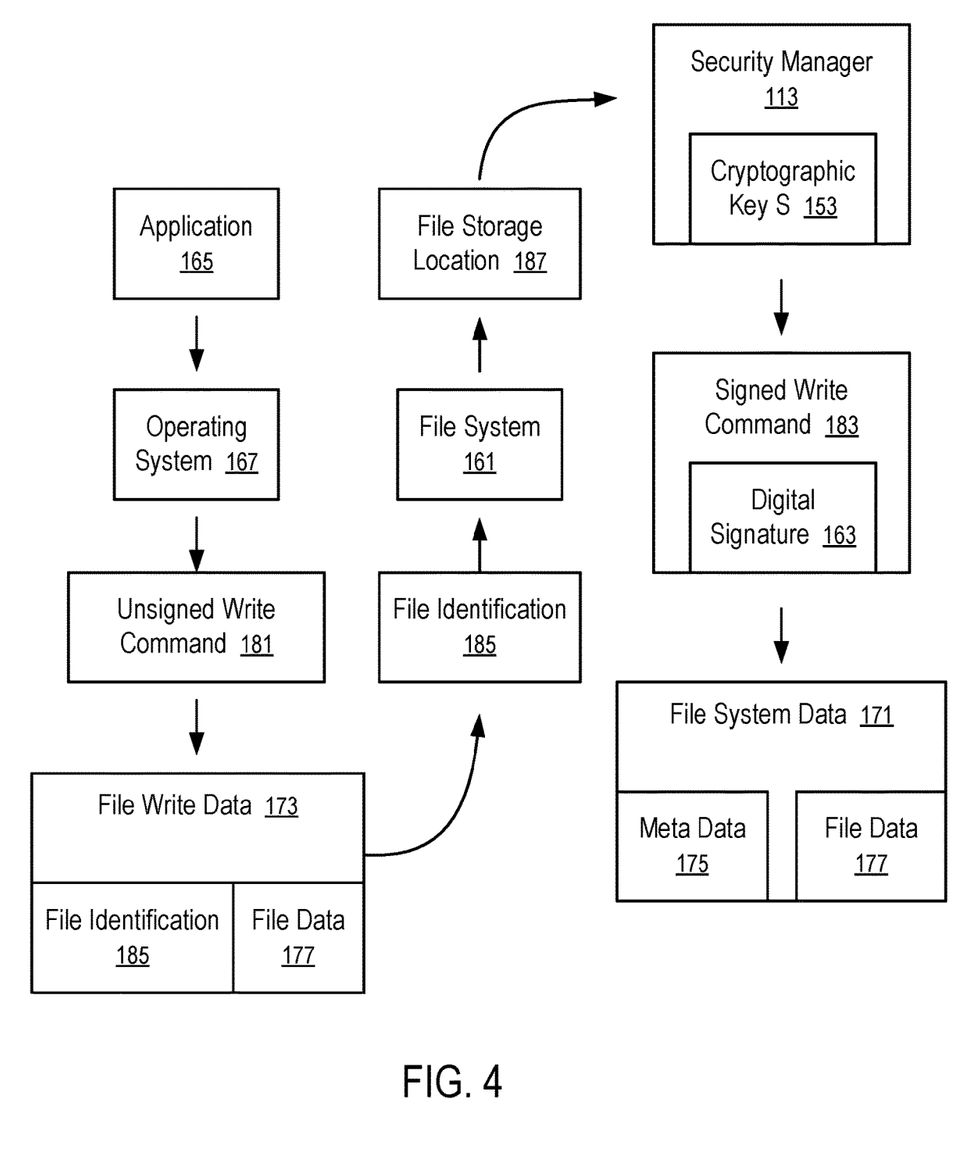
FIG. 4 illustrates the use of a security manager to write files into a file system mounted in a secure memory device according to one embodiment.

FIG. 4 illustrates the use of a security manager to write files into a file system mounted in a secure memory device according to one embodiment. For example, the operations of FIG. 4 can be implemented in the computing system 100 of FIG. 1 having a memory device 130 of FIG. 2 using the technique of FIG. 3.

In FIG. 4, an application 165 running in the processing device 118 of the host system 120 calls an operating system 167 of the computing system 100. For example, the operating system 167 can be initially stored in the secure memory region 133 (or another secure memory region in the memory device 130). During a boot time, the security manager 113 can verify that the operating system 167 has not been changed, tampered with, and/or corrupted, before providing the operating system 167 to the processing device 118 of the host system 120 for execution.

In general, the operating system 167 and/or the application 165 may not have the credential issue signed command to write data into the secure memory region 133 of the memory device 130 in the memory sub-system 110. However, the operating system 167 may mount a file system 161 in the secure memory region 133 of the memory device 130.

When the application 165 requests a change to the file system 161, the operating system 167 can generate an unsigned write command 181. When the memory device 130 receives the unsigned write command 181, the memory device 130 can buffer the command 181 in the non-secure memory region 131 as part of the file write data 173. For example, a write record (e.g., 121, or 123) can be generated for the unsigned write command 181. In some implementations, the write record (e.g., 121, or 123) is generated and/or buffered in the non-secure memory region 131 for a specific file recording session. When there is no valid file recording session, an unsigned write command 181 can be rejected.

For example, the file write data 173 generated for the write command 181 can include a file identification 185 and file data 177. The file identification 185 identifies a file in the file system 161 and a location of the file data 177 within the file.

When the file is ready to be committed into the file system 161, the file system 161 determines a file storage location 187 in the secure memory region 133 for the file identification 185. A routine of the security manager 113 can be called by the operating system 167 to identify and write the file data 177 at the file storage location 187 in the secure memory region 133 using signed write commands 183.

For example, the routine of the security manager 113 has a cryptographic key 153 usable to sign a command for writing the file data 177. The signed write command 183 includes a digital signature 163 verifiable by the memory device 130 using the cryptographic key 151. When asymmetric cryptography is used, the cryptographic key 153 can be a private key of a key pair; and the cryptographic key 151 can be a public key of the key pair. When symmetric cryptography is used, the cryptographic key 153 is the same as the cryptographic key 151. The cryptographic key 153 and/or 151 can be generated at the time of booting up the operating system 167 and/or the initialization of the routine of the security manager 113.

In response to the signed write command 183 generated by the routine of the security manager 113 (e.g., executed in the host system 120 and/or the controller 115), the memory device 130 verifies the digital signature 163 to write the file data 177 into the secure memory region 133. The meta data 175 can be updated in a similar way using signed write commands to store data representative of the relation between the file identification 185 and the file storage location 187. The meta data 175 allows the file system to retrieve the file data 177 for the corresponding locations in the secure memory region 133 based on a reference to the file identification 185. For example, the application 165 can use the file identification 185 to read/retrieve the file data 177.

In general, records of write commands (e.g., 181) of an operating system 167 can be buffered in a non-secure memory region 131; and a security manager 113 can be implemented as a centralized agent of the operating system 167 and/or the file system to write valid file data 177 into the secure memory region 133 using authorization verifiable via digital signatures created using the cryptographic key 153.

Figure 5:
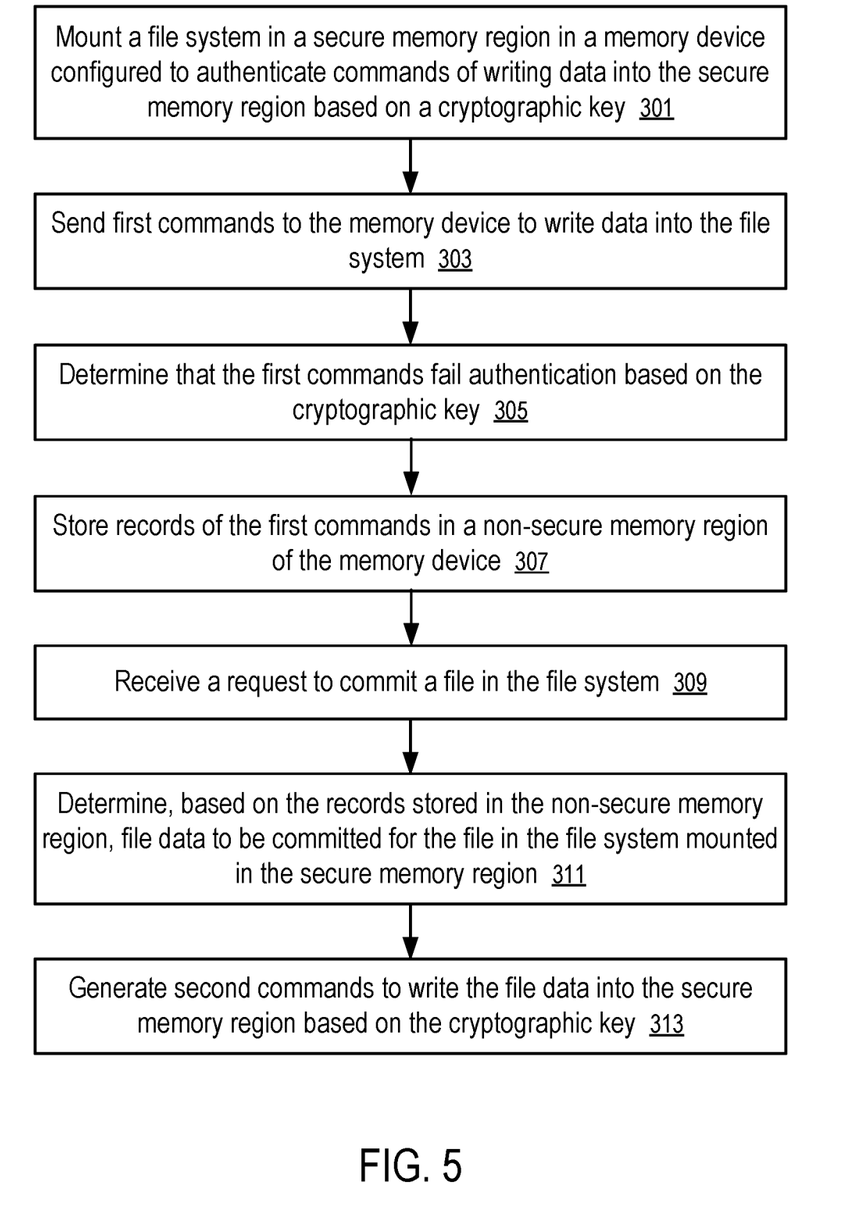
FIG. 5 shows a method of write files into a secure memory device according to one embodiment.

FIG. 5 shows a method of write files into a secure memory device according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 is performed at least in part by the controller 150 and/or controller 115 of FIG. 1, or processing logic in the memory device 130 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 5, at block 301, a file system 161 is mounted in a secure memory region 133 in a memory device 130. The memory device 130 is configured to authenticate commands of writing data into the secure memory region 133 based on a cryptographic key 153.

For example, when a write command is signed using the cryptographic key 153, the write command is executed by the memory device 130 to write the data into the secure memory region 133; otherwise, the command is rejected, or buffered into a non-secure memory region 131.

At block 303, a host system 120 and/or a controller 115 of a memory sub-system sends first commands to the memory device 130 to write data into the file system 161.

For example, the first commands can be the unsigned write commands 181 generated by one or more non-privileged modules of an operating system 167. The non-privileged modules do not have the cryptographic key 153 go pass the authentication performed by the memory device 130 for writing data into the secure memory region 133.

At block 305, the memory device 130 determines that the first commands fail authentication based on the cryptographic key 153 (e.g., for the lack of signal signatures).

At block 307, the memory device 130 and/or the security manager 113 stores write records (e.g., 121, ..., 123) of the first commands in a non-secure memory region 131.

At block 309, the computing system 100 receives a request to commit a file in the file system 161.

At block 311, the security manager 113 determines, based on the write records (e.g., 121, ..., 123) stored in the non-secure memory region 131, file data 177 to be committed for the file in the file system 161 mounted in the secure memory region 133.

At block 313, the security manager 113 generates second commands to write the file data 177 into the secure memory region 133 based on the cryptographic key 153.

For example, the first commands have no digital signatures and thus fail authentication based on the cryptographic key 153. The second commands have digital signatures signed using the cryptographic key 153 and thus can pass the authentication for execution.

Optionally, the security manager 113 and/or the operating system 167 can open a recording session for the file in the file system such that, when the recording session is active, unsigned write commands 181 can be recorded in the non-secure memory region 131. In response to closing the recording session, the operating system 167 and/or the security manager 113 can commit the file to the file system 161.

The operating system 167 and/or the security manager 113 can determine a storage location 187 in the secure memory region 133 allocated to store the content of the file. The second commands can be generated based on the storage location 187. The security manager 113 can further generate one or more third commands to write meta data 175 of the file system 161 based on the cryptographic key 153. For example, the third commands can be signed to include digital signatures 163 to pass authentication performed by the memory device 130 for writing into the secure memory region 133. The meta data 175 can identify the association between logical locations in the file and the physical storage locations of the file data 177 stored in the secure memory region 133.

For example, the first commands can include a logical identification of the file and its data in the file system 161. The logical identification independent of the physical storage location of the content of the file in the memory device 130.

For example, the operating system 167 can receive requests from applications (e.g., 165) to generate the first commands. Modules of the operating system not in possession of the cryptographic key 153 can write the records of the file write requests into the non-secure memory region 131 using unsigned write commands 181. When the operating system 167 is ready to commit the file, it can call the security manager 113 to write the file into the secure memory region 131 based on the write records (e.g., 121, ..., 123) in the non-secure memory region 131.

Optionally, the cryptographic key 153 of the security manager 113 can be configured at the boot time of the operating system 167. For example, during the boot time, the instructions of the security manager 113 can be loaded from the secure memory region 133 for execution; and the cryptographic key 153 can be generated for the security manager 113 at the time of its instantiating. The security manager 113 is authorized to write data into the secure memory region 133 by receiving the cryptographic key 153 that can be used to generate digital signatures 163 verifiable using a corresponding key 151 stored in the memory device 130.

Figure 6:
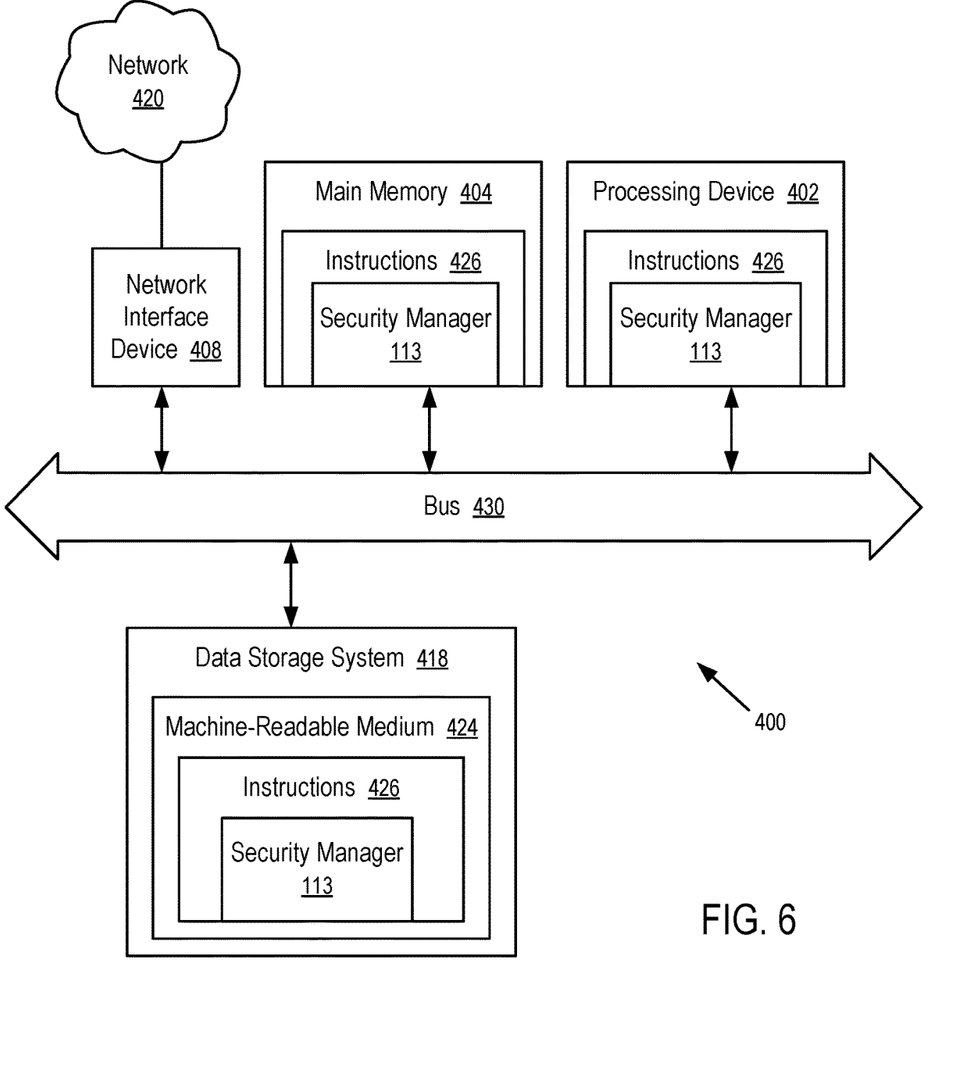
FIG. 6 is a block diagram of an example computer system in which embodiments of the present disclosure can operate.

FIG. 6 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations of a security manager 113 (e.g., to execute instructions to perform operations corresponding to the security manager 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1.

In one embodiment, the instructions 426 include instructions to implement functionality corresponding to a security manager 113 (e.g., the security manager 113 described with reference to FIGS. 1-5). While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
    mounting a file system into a secure memory region in a memory device configured to authenticate commands of writing data into the secure memory region based on a cryptographic key;
    sending first commands to the memory device to write data into the file system;
    determining that the first commands fail authentication based on the cryptographic key;
    storing records of the first commands in a non-secure memory region of the memory device; and
    in response to a request to commit a file in the file system, determining, based on the records stored in the non-secure memory region, file data to be committed for the file in the file system mounted in the secure memory region; and
    generating second commands to write the file data into the secure memory region based on the cryptographic key.

2. The method of claim 1, wherein the first commands have no digital signatures; and the second commands have digital signatures signed using the cryptographic key.

3. The method of claim 2, further comprising:
    opening a recording session for the file in the file system, wherein the first commands are recorded in the non-secure memory region in response to the recording session being active.

4. The method of claim 3, further comprising:
    closing the recording session, wherein the request to commit the file is in response to the closing of the recording session.

5. The method of claim 4, further comprising:
    determining storage locations in the secure memory region allocated to store content of the file;
    wherein the second commands are based on the storage locations.

6. The method of claim 5, further comprising:
    generating one or more third commands to write meta data of the file system based on the cryptographic key, the meta data identifying the storage locations of the content of the file.

7. The method of claim 5, wherein the first commands include an identification of the file in the file system; and wherein the identification is independent of a storage location of the content of the file.

8. The method of claim 5, further comprising:
    receiving requests in an operating system to generate the first commands, wherein the operating system is not in possession of the cryptographic key; and
    calling, by the operating system, a security manager to commit the file in the file system, wherein the security manager is in possession of the cryptographic key.

9. The method of claim 8, further comprising:
    loading instructions of the security manager from the secure memory region for execution at a boot time of the operating system.

10. The method of claim 9, further comprising:
    configuring, during the boot time, the security manager with the cryptographic key to authorize the security manager to write data into the secure memory region.

11. A memory device, comprising:
    a secure memory region and a non-secure memory region;
    a controller configured to authenticate commands of writing data into the secure memory region based on a cryptographic key;
    wherein in response to first commands received in the controller to write data into a file system mounted in the secure memory region and the first commands failing authentication based on the cryptographic key, the controller is configured to store records of the first commands in the non-secure memory region; and
    wherein in response to a request to commit a file in the file system, and identification of, based on the records stored in the non-secure memory region, file data to be committed for the file in the file system mounted in the secure memory region, the controller is configured to write the file data into the secure memory region.

12. The memory device of claim 11, wherein the file data is written into the secure memory region via executing second commands generated based on the cryptographic key; and
wherein the first commands have no digital signatures; and the second commands have digital signatures signed using the cryptographic key.

13. The memory device of claim 12, wherein the controller is further configured to:
executing the second commands to store content of the file at storage locations in the secure memory region; and
executing one or more third commands to write meta data of the file system based on the cryptographic key, the meta data identifying the storage locations of the content of the file.

14. The memory device of claim 13, wherein the records of the first commands include an identification of the file in the file system; and wherein the identification of the file is independent of a storage location of the content of the file.

15. The memory device of claim 14, wherein the controller is further configured to, at a boot time of an operating system of a computing system having the memory device, load instructions of a security manager from the secure memory region for execution, the instructions executable to generate the second commands.

16. The memory device of claim 15, wherein the controller is further configured to, during the boot time, provide the security manager with the cryptographic key to authorize the security manager to write data into the secure memory region.

17. A non-transitory computer storage medium storing instructions which when, executed in a computing system having a memory device with a secure memory region mounted therein a file system and a non-secure memory region, cause the computing system to perform a method, the method comprising:
receiving a request to commit a file in the file system;
reading records of first commands in the non-secure memory region of the memory device, the first commands configured to write data into the file system mounted in the secure memory region;
determining, based on the records, file data to be committed for the file in the file system mounted in the secure memory region; and
generating second commands to write the file data into the secure memory region based on a cryptographic key, wherein the memory device is configured to authenticate commands of writing data into the secure memory region based on the cryptographic key.

18. The non-transitory computer storage medium of claim 17, wherein the first commands have no digital signatures; and the second commands have digital signatures signed using the cryptographic key; and the method further comprises:
opening a recording session for the file in the file system, wherein the first commands are recorded in the non-secure memory region in response to the recording session being active; and
closing the recording session, wherein the request to commit the file is in response to the closing of the recording session.

19. The non-transitory computer storage medium of claim 18, wherein the method further comprises:
determining storage locations in the secure memory region allocated to store content of the file, wherein the second commands are based on the storage locations; and
generating one or more third commands to write meta data of the file system based on the cryptographic key, the meta data identifying the storage locations of the content of the file.

20. The non-transitory computer storage medium of claim 19, wherein the first commands include an identification of the file in the file system; wherein the identification is independent of a storage location of the content of the file; and
wherein the method further comprises:
receiving requests in an operating system to generate the first commands, wherein the operating system is not in possession of the cryptographic key;
wherein the request is received from the operating system to commit the file in the file system.

* * * * *